(12) United States Patent
Robinson et al.

(10) Patent No.: US 10,663,835 B2
(45) Date of Patent: May 26, 2020

(54) DYNAMIC PRIVACY GLASSES

(71) Applicant: Red Hat, Inc., Raleigh, NC (US)

(72) Inventors: Paul Fletcher Robinson, Whitley Bay (GB); Thomas John Jenkinson, North Yorkshire (GB)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 15/881,274

(22) Filed: Jan. 26, 2018

(65) Prior Publication Data

US 2019/0235347 A1 Aug. 1, 2019

(51) Int. Cl.
*G02F 1/29* (2006.01)
*G06F 21/84* (2013.01)

(52) U.S. Cl.
CPC ............ *G02F 1/29* (2013.01); *G06F 21/84* (2013.01); *G02F 2203/07* (2013.01)

(58) Field of Classification Search
CPC ......... G02F 1/29; G02F 2203/07; G06F 21/84
See application file for complete search history.

(56) References Cited

U.S. PATENT DOCUMENTS

| 8,867,780 | B2 * | 10/2014 | Hodge | G06F 21/84 |
| | | | | 382/100 |
| 2010/0238097 | A1 | 9/2010 | Baik et al. | |
| 2013/0003177 | A1 * | 1/2013 | Ko | H04N 13/398 |
| | | | | 359/464 |
| 2013/0021666 | A1 | 1/2013 | Rui | |
| 2015/0189173 | A1 * | 7/2015 | Ye | G02F 1/29 |
| | | | | 348/218.1 |
| 2016/0225343 | A1 * | 8/2016 | Ek | H04N 13/334 |
| 2017/0208228 | A1 * | 7/2017 | Takeo | H04N 5/232 |
| 2019/0080112 | A1 * | 3/2019 | Adams | G06F 3/0481 |

OTHER PUBLICATIONS (Amazing Secret Monitor! (How to) [online].[retrieved on Jan. 26, 2018]. Retrieved from the Internet: <URL: https://www.youtube.com/watch?v=zL_HAmWQTgA>; Standard YouTube License; Published on Oct. 29, 2013 (3 pages).
(3M Privacy Filter) [online]. [retrieved on Jan. 26, 2018]. Retrieved from the Internet: <URL: https://www.amazon.co.uk/3M-Privacy-Filter-14-1-PF14-1/dp/B00006B8A9> (8 pages).
(FAQ How does 3D projection work?) [online]. [retrieved on Jan. 26, 2018]. Retrieved from the Internet: >URL: http://www.awater3d.com/en/faq/faq-overview/circular-polarization-filters/> (2 pages).

\* cited by examiner

*Primary Examiner* — Chun-Nan Lin
(74) *Attorney, Agent, or Firm* — K&L Gates LLP

(57) ABSTRACT

A system includes a memory, a processor in communication with the memory, a unique identifier generator, a transmitter, at least one receiver, a display, and a viewing aid. The transmitter is configured to transmit information about a unique identifier generated from the unique identifier generator. The receiver is configured to receive the information from the transmitter. The display is configured to emit polarized light at a plurality of polarizations. Additionally, the plurality of polarizations includes a plurality of different noise polarizations and polarized light at a polarization factor based on the unique identifier. The viewing aid has a filter that is configured to pass light at the polarization factor and block light at the plurality of different noise polarizations.

13 Claims, 8 Drawing Sheets

DYNAMIC PRIVACY GLASSES

BACKGROUND

Electronic devices, including computers, tablets, televisions, cell phones, etc. include displays for providing information to users. Information can be provided on displays via word processors, the internet, email, videos. The information may be displayed as texts, graphics, and media. Users may also generate information on the display using computer applications. The electronic devices can include any suitable type of display, including for example a projection, plasma, light-emitting diode (LED), liquid-crystal display (LCD), organic light-emitting diode (OLED), etc.

Displays may have different screen resolutions, pixel counts, and viewing angles. For example, an LCD is an electronically modulated optical device that uses the light-modulating properties of liquid crystals. Each pixel of an LCD typically consists of a layer of molecules aligned between two transparent electrodes, and two orthogonal polarizing filters aligned along a vertical axis and a horizontal axis of the display.

SUMMARY

The present disclosure provides new and innovative dynamic privacy glasses and methods of adjusting viewing aids and displays to securely provide content to authorized users. In an example, a system includes a memory, a processor in communication with the memory, a unique identifier generator, a transmitter, at least one receiver, a display, and a viewing aid. The transmitter is configured to transmit information about a unique identifier generated from the unique identifier generator. The receiver is configured to receive the information from the transmitter. The display is configured to emit polarized light at a plurality of polarizations. Additionally, the plurality of polarizations includes a plurality of different noise polarizations and polarized light at a polarization factor based on the unique identifier. The viewing aid has a filter that is configured to pass light at the polarization factor and block light at the plurality of different noise polarizations.

In an example, a method includes (i) receiving a unique identifier from the unique identifier generator, (ii) determining a polarization factor from the unique identifier, (iii) transmitting a polarized light from the display at a plurality of polarizations including a plurality of different noise polarizations and a unique polarization based on the polarization factor, (iv) adjusting a filter associated with a viewing aid to pass light at the unique polarization and block light at the plurality of different noise polarizations, and (v) iterating (i), (ii), (iii), and (iv) for each successive unique identifier received.

In an example, a method includes initializing a viewing aid and a display with a shared secret, determining a first polarization factor from the shared secret, adjusting the display to polarize a first portion of light emitted from the display at the first polarization factor and a second portion of light emitted from the display at a plurality of noise polarizations, and adjusting a filter on the viewing aid to pass the first portion light emitted from the display at the first polarization factor and block light at the plurality of different noise polarizations.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
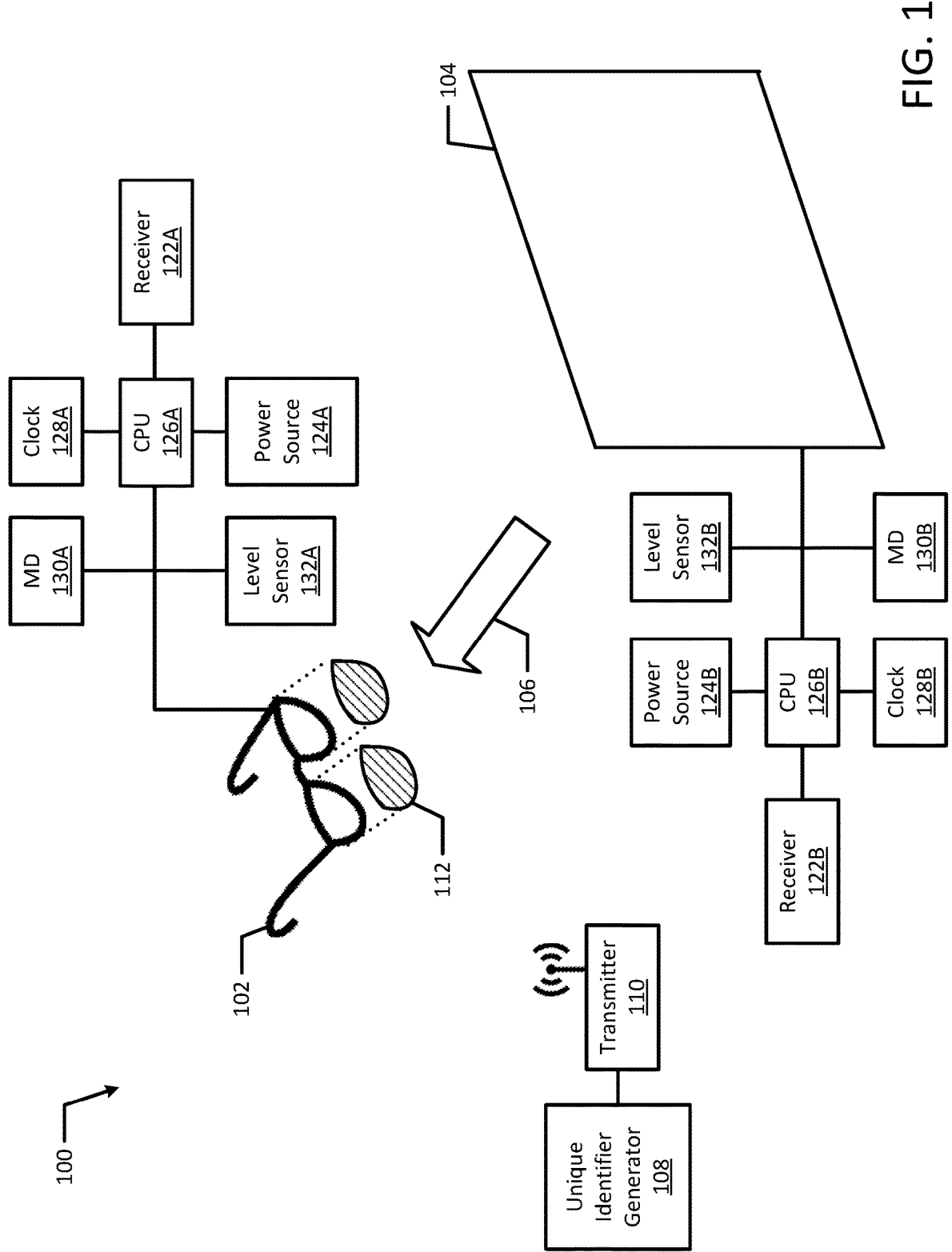
FIG. 1 illustrates a block diagram of an example dynamic privacy system for viewing a display, according to example embodiments of the present disclosure.

Systems and methods are disclosed for dynamic privacy glasses as well as techniques for adjusting dynamic privacy glasses or other viewing aids, as well as displays, to securely provide content to authorized users. For example, the disclosed systems and methods may be used to improve viewing security such that only an authorized user using the designated visual aid (e.g., wearing the glasses) can view the protected content on a display or screen.

When using a display or screen (e.g., computer, tablet, or phone screens) in a public place, there may be a risk of unauthorized users viewing the display. For example, when viewing confidential information, in public (e.g., on public transportation) an unauthorized viewer may be able to read the display. Similarly, a doctor may consult their tablet containing confidential information, which may inadvertently be visible to other unauthorized users (e.g., patients or visitors).

Typically, displays can have large viewing angles so that a user can view the displayed content from multiple positions without experiencing eyestrain. However, large viewing angles also make the displayed content visible to other people in the area. When a user is displaying confidential content, the user may wish to securely view the content or at least make the content less visible to others.

To prevent easy access and large viewing angles on a user's display, a privacy filter may be used to reduce the viewing angle of the display to a very narrow angle that is typically perpendicular to the display. By doing so, the user may prevent individuals outside the narrow viewing angle from viewing the display. However, using a privacy filter significantly reduces the viewing angle of the display and reduces the authorized user's ability to move around and view the display from different viewing angles. Additionally, using a privacy filter or screen often reduces the brightness of the display (e.g., amount of light reaching the user), and therefore can increase eyestrain that the authorized user experiences. Furthermore, a privacy screen does not prevent individuals behind the user from viewing the display. For example, the displayed content can still be viewed by looking over one's shoulder. Thus, typical privacy filters make it more difficult for the authorized user to see the display while still allowing others to view the display. Other hardware modifications may be implemented by removing a polarizing film from the display and implementing a static polarizing filter on a viewing aid. This increases the viewing angles available to the user, but this type of hardware modification is vulnerable to an unauthorized user wearing commonly available accessories. For example, anyone with the same static polarization filter would be able to view the display. If the filter is static, a malicious party could rotate a circular polarizing lens filter until they got a clear image of the display. Both of the above discussed privacy screens and privacy filters are flawed because either they do not prevent all unauthorized users from viewing the display or they are easily hacked.

To securely provide content to authorized users, the techniques disclosed herein advantageously provide dynamic privacy glasses that are paired with a display that prevents unauthorized users from viewing the content. For example, the display and viewing aid are paired such that they share a unique identifier (e.g., a secret or random number). Once paired, the unique identifier is then deterministically converted to a polarization factor, which dictates the polarization angle that the content is displayed at while other parts of the display are used for noise (e.g., pixels displaying noise at various polarization angles different from the polarization factor). Similarly, the polarization angle dictates the adjustment of a filter on the viewing aid such that the filter passes light from that polarization angle to the authorized user and blocks the light from the noise pixels at the different noise polarization angles. While synchronized and paired, the display and viewing aid dynamically change polarization angles during a viewing session to enhance the security to the authorized user. For example, unlike the hardware modification noted above where the static polarizing film is removed from the monitor and added to the user's glasses, the techniques disclosed herein prevent a hacker from viewing the information with a simple hardware device (e.g., a polarization filter on the glasses). Additionally, by continuously changing the polarization angle that the content is displayed at, any potential hack or breach ceases and is further prevented once the polarization angle changes.

FIG. 1 depicts a high-level component diagram of an example dynamic privacy system 100 for viewing a display in accordance with one or more aspects of the present disclosure. The dynamic privacy system 100 may include a viewing aid 102 and a display 104 that emits polarized light 106. The display 104 may emit polarized light 106 at a plurality of polarizations. For example, the display 104 may include liquid crystals configured to polarize light intended for an authorized user at a polarization factor and may also emit noise at different noise polarizations. The polarization factor may be measured in radians, degrees, arc minutes, arc seconds, etc. The display 104 may have dedicated noise regions or pixels that emit polarized light at various noise polarizations. In an example, vertical or horizontal polarization may be used. In another example, circular polarization may be used.

The viewing aid 102 may include a filter 112 that is configured to pass polarized light intended for the authorized user (e.g., light polarized at a polarization factor) and block noise or light generated from noise pixels. The filter 112 may dynamically change such that it passes the appropriate light to the authorized user based on the polarization changes used by the display 104.

Additionally, viewing aid 102 may have an associated receiver 122A, power source 124A, processor 126A, clock 128A, memory device 130A, and/or level sensor 132A. Similarly, display 104 may have an associated receiver 122B, power source 124B, processor 126B, clock 128B, memory device 130B, and/or level sensor 132B.

Filter 112 may include a polarizing grill that is wide enough to provide some flexibility in the viewing angle to the user. For example, by providing a wider polarizing grill, the user may be able to view authorized content while their head is tilted. In general, the wider the polarizing grill, the lower the privacy strength of the system 100. To maintain higher security, level sensors 132A-B may measure the angle at which the authorized user is tilting their head and may correct the angle of the polarization on the viewing aid 102, the display 104, or both. For example, the display 104 and/or the viewing aid 102 may dynamically adjust according to user's position relative to the display. In an example, the level sensor 132A may measure the viewing angle of the viewing aid 102 and may synchronize the viewing aid angle to a viewing angle on the display 104. Similarly, level sensor 132B may measure the viewing angle of the display 104 and may synchronize the display angle to a viewing angle of the viewing aid 102.

The privacy system 100 may also include a unique identifier generator 108 and a transmitter 110. The unique identifier generator 108 may be configured to generate a random number, a pseudo-random number, a key-secret pair, a token, a text string, a hash, a checksum, or any other unique identifier. The unique identifier generator 108 may also generate a unique starting value or a seed. For example, a srand(x) function may be used to generate a starting seed value, which may later be used to determine a sequence of pseudo-random integer values. Unique identifier generator 108 may be positioned remotely from display 104 and viewing aid 102 or may be integrated into either the display 104 or viewing aid 102. Transmitter 110 may transmit information about the unique identifier, which may be received by the respective receivers 122A-B of the viewing aid 102 and display 104.

In an example, the unique identifier generator 108 may generate a random number using a rand( ) function. The unique identifier may also be generated using a checksum function, for example, a Secure Hash Algorithm 1 (SHA-1), a Secure Hash Algorithm 256 (SHA-256), a Secure Hash Algorithm 512 (SHA-512), and/or a MD5 algorithm.

Once the viewing aid 102 is paired with display 104, the unique identifier or seed value may be used to generate a sequence of numbers. For example, both the viewing aid 102 and display 104 may generate the same sequence of numbers from a given unique identifier or seed value. The sequence of numbers may be used to dynamically change the polarization factor of the viewing aid 102 and display 104, thereby preventing unauthorized users from viewing the displayed information. The more frequent the polarization factor changes, the greater the security of the system.

The viewing aid 102 and display 104 may synchronize during operation to ensure that both are associated with the same polarization factor at the same time. Viewing aid 102 and display 104 may synchronize on time (e.g., a time on a clock), frequency, or on frames of display 104. In an example, a timing of the viewing aid 102 and display 104 may be synchronized using clocks 128A-B. In an example, the srand(time(NULL)) function may use the internal clock (e.g., clock 128A-B) to control the choice of the seed value to add an additional level of security to system 100. As the time continually changes, the seed is continually changing, which changes the sequence of pseudo-random values used by the viewing aid 102 and display104. Changing the polarization factor more frequently improves security by reducing the time an unauthorized user has to hack the polarization angle and view the display 104 before the display changes the polarization angle.

Processors 126A-B, such as physical processors may be communicatively coupled to memory devices (e.g., MD 130A-B) and input/output devices (e.g., I/O 140A-C). As used herein, physical processor or processor 126A-B, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 126A-B may be interconnected using a variety of techniques, ranging from a point-to-point processor interconnect, to a system area network, such as an Ethernet-based network. Local connections within each node, including the connections between a processor 126A-B and a memory device 130A-B may be provided by one or more local buses of suitable architecture, for example, peripheral component interconnect (PCI).

As discussed herein, a memory device 130A-B refers to a volatile or non-volatile memory device, such as RAM, ROM, EEPROM, or any other device capable of storing data. Processors 126A-B may be interconnected using a variety of techniques, ranging from a point-to-point processor interconnect, to a system area network, such as an Ethernet-based network. Connections between a processor 126A-B and a memory device 130A-C may be provided by one or more local buses of suitable architecture, for example, peripheral component interconnect (PCI).

Figure 2A:
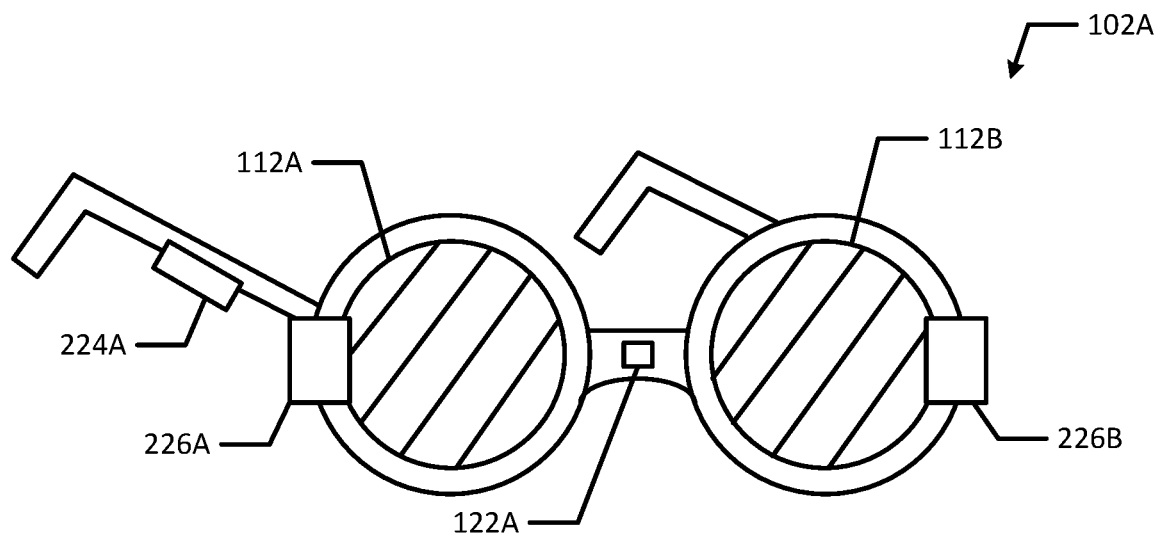
FIGS. 2A and 2B illustrate block diagrams of example dynamic privacy viewing aids according to example embodiments of the present disclosure.
Figure 2B:
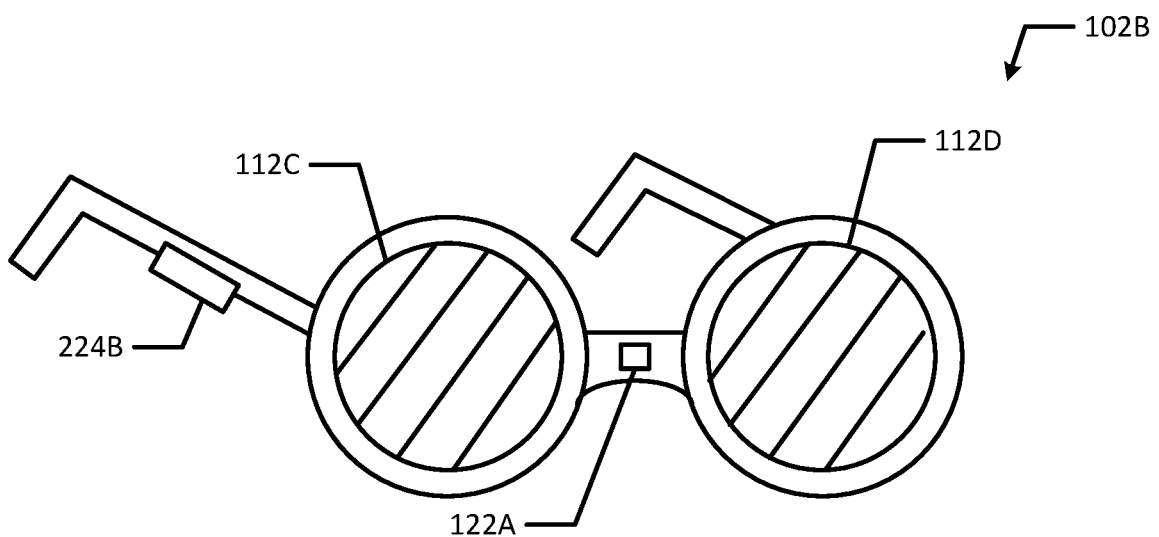

FIGS. 2A and 2B illustrate example dynamic privacy viewing aids 102A-B. As illustrated in FIG. 2A, viewing aid 102A includes rotatable filters 112A-B, receiver 122A, a battery 224A, and motors 226A-B. Rotatable filters 112A-B may be rotated via motors 226A-B. For example, motors 226A-B may rotate filters 112A-B to a predetermined position or at a predetermined rate (e.g., rotations per minute (RPM)) based on the polarization factor. In an example motors 226A-B may be ball-bearing DC brushless motors. Viewing aid 102A may also include a magnetic or light encoder to track the position of filters 112A-B to ensure that the viewing aid 102A is passing the appropriate polarized light to the authorized user.

As illustrated in FIG. 2B, viewing aid 102B includes liquid crystal filters 112C-D (e.g. LCD filters), a receiver 122A, and a battery 224B. Battery 224B or other power source 124A may apply a voltage across liquid crystal filters 112C-D to adjust what light is passed through the filters 112C-D. Depending on the voltage applied, different polarizations of light may be passed to the authorized user.

Viewing aids 102A-B, hereinafter referred to generally as viewing aid 102, may use additional power sources 124A other than batteries 224A-B (e.g., wired connection, solar, motion, RF). Additionally, it should be appreciated that other viewing aids 102 with different types of filters 112 and configurations may be used to pass light at the polarization factor to the authorized user and block noise or light emitted at different noise polarizations. Viewing aid 102 may be a headset, a pair of glasses, a visor, a helmet, a face shield, a pair of goggles, a hand-held viewing scope, or the like.

Figure 3:
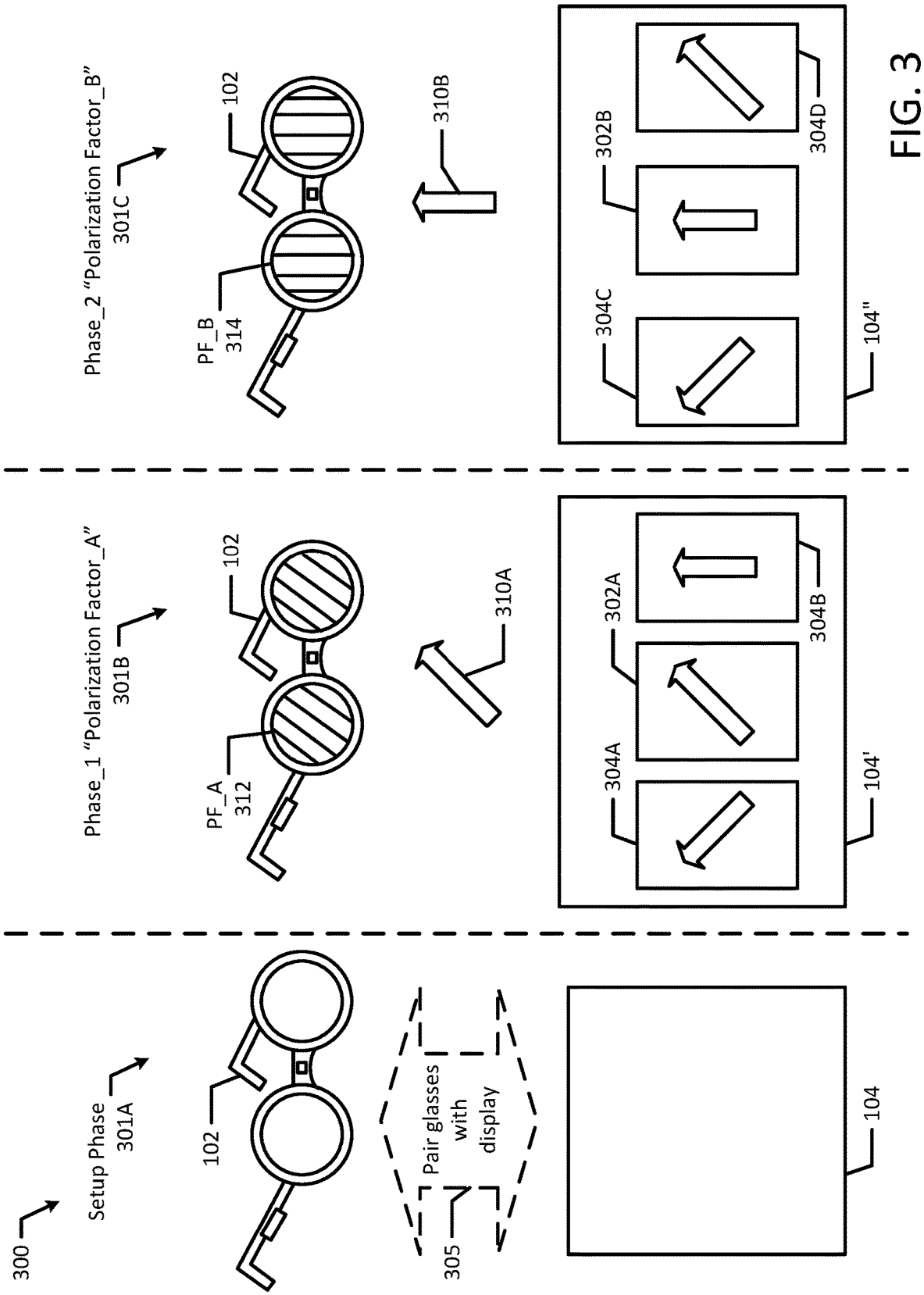
FIG. 3 illustrates a block diagram of an example dynamic privacy system for viewing a display, according to example embodiments of the present disclosure.

FIG. 3 illustrates example dynamic privacy system 300 for viewing a display. For example, a viewing aid 102 and display 104 dynamically adjusts their respective display and filter parameters to provide security to an authorized user. In the setup phase 301A, viewing aid 102 and display 104 are paired together at block 305. For example, viewing aid 102 and display 104 may be synchronized or initialized such that they share a secret or a unique identifier. In an example, a subscription service may provide a secret, such as a key-secret pair or a token that is shared between the viewing aid 102 and display 104.

After the viewing aid 102 and display are paired and synchronized, a polarization factor may be determined from the secret or unique identifier. For example, "polarization factor_A" may be determined from the secret or unique identifier. The polarization factor may be an angle value, such as a number between 1 and 360. A portion of the display 104 or a set of pixels 302A may start emitting polarized light 310A at the polarization factor (e.g., light polarized at 45 degrees) while the noise pixels 304A-B emit polarized light at different polarizations (e.g., 270 degrees and 90 degrees) as indicated by display 104' in phase_1 301B. The filter 112 of viewing aid 102 adjusts according to the "polarization factor_A" 312, which is based on the unique identifier, such that the polarized light 310A at "polarization factor_A" 312 is passed to the authorized user's eyes and the light emitted from the noise pixels 304A-B at the different noise polarizations is blocked from reaching the authorized user's eyes.

To increase security, the polarization factor may be changed after a period of time to "polarization factor_B". For example, the security is proportional to the rate at which the angle changes, which reduces the ability to maliciously decrypt the displayed content using a brute force technique. A portion of the display 104 or a set of pixels 302B may start emitting polarized light 310A at the polarization factor (e.g., polarized at 90 degrees) while the noise pixels 304C-D emit polarized light at different polarizations (e.g., 270 degrees and 45 degrees) as indicated by display 104" in phase_2 301C. As in phase_1 301B, the filter 112 of viewing aid 102 adjusts according to the "polarization factor_B" 314, which is based on the unique identifier, such that the polarized light 310B at "polarization factor_B" 314 is passed to the authorized user and the light emitted from the noise pixels 304C-D at the different noise polarizations is blocked from the user's perspective.

The display 104 may have a predetermined set of pixels that are used as noise pixels 304A-D. A noise pixel (e.g., noise pixel 304A) may be configured to emit noise at a single polarization angle. For example, noise pixel 304A may emit noise at 270 degrees regardless of the viewing phase. The noise pixels 304A-D may be numbered, positioned, and arranged in such a way that even if each noise pixel emits noise at a single, non-changing polarization angle, the noise appears to be random and dynamic to an unauthorized user. For example, a user may set a security setting based on high, medium, or low amount of noise, by increasing or decreasing output of noise from a set of noise pixels, or changing a quantity of noise pixels. Alternatively, different sets of pixels or varying amounts of noise pixels 304A-D may be used during a viewing session. Noise pixels 304A-D may typically comprise between 50 and 90 percent of the display 104. In an example, approximately 75 percent of the pixels of display 104 may be used as noise pixels 304A-D. While additional noise pixels 304A-D may reduce the overall resolution of the content on display 104, the added noise pixels also advantageously improve security. For example, if an unauthorized viewer were attempting to hack or match the polarization factor, the additional noise pixels 304A-D would further distort the content or image on display 104 when viewed through different polarization filter angles.

The display 104 may also be set up to provide content at a predetermined set of polarization angles. For example, the display 104 may provide content at 18 or 36 different polarization angles, such that the polarization factor is set to one of the polarization angles allowed by the display 104.

The filters 112 for each lens of viewing display 102 may adjust simultaneously. In another example, to reduce blackout time or downtime (e.g., time that the filter 112 is adjusting and is not at the proper polarization factor or angle), one lens (e.g., the left lens) may adjust prior to display 104 changing between phase 1 and phase 2. While the left lens is adjusting, the right lens still enables the authorized user to read the display 104 and by the time the display 104 changes to phase 2, the left lens will be set to "polarization factor_B" so the authorized user will be able to continue reading the display 104 without any perceived downtime. When the display changes to "polarization factor_B" in phase 2, the right lens can then adjust to match the left lens. This process may be repeated for each phase change of the viewing session.

Active shutter may be used to disable a lens while the filter is adjusting to prevent the filter rotation from interrupting or interfering with the authorized user's viewing, for example, avoiding or lessening flicker that may be perceived by the user. The active shutter may disable the left lens as the filter on the left lens is rotated to prevent noise to be passed to the authorized user's eye during filter adjustment. For example, when adjusting the filter from a polarization factor of 10 degrees to 90 degrees, noise pixels emitting noise at a polarization angle of 40 degrees would pass to the authorized user's eye as the filter 112 is positioned at 45 degrees during the adjustment process.

It may also be beneficial to reduce adjustment time for filters 112. For example, referring back to FIG. 2A, rotatable filters 112A-B may be adjusted by motors 226A-B. In an example, a group of subsequent polarization factors may be restricted to less than 360 degrees of rotation. For example, each set of polarization factors may be limited to a predetermined range of rotation. In an example with a set of four polarization factors and the predetermined range of rotation set to 90 degrees, the "polarization factor_A" and the next three subsequent polarization factors may be all between 45 degrees and 135 degrees (e.g., 45 degrees, 121 degrees, 58 degrees, and 95 degrees), which reduces the adjustment time of motors 226A-B because the motors have to rotate the filters along a short angular path. Then, the next set of four polarizations may be limited to a 90 degree range between 90 degrees and 180 degrees. Additionally, by limiting the range of rotation, motors 226A-B may advantageously rotate filters at a lower rpm to conserve power and extend battery life so the authorized user can securely view display 104 for multiple or extended viewing sessions. The polarization factors may also be limited to a predetermined direction of rotation, thereby avoiding motor hysteresis of switching directions and extending the life of the motor. For example, each set of polarization factors may be selected such that the distance the filter must travel for the next factor is less in a forward direction than it would be in a reverse direction. In an example, if a first polarization factor is 90 degrees, then the next polarization factor may be selected at an angle less than 270 degrees (e.g., 255 degrees) such that the angular distance traveled in the forward direction (e.g. 255 degrees minus 90 degrees=165 degrees) is less than the angular distance the lens would travel in a reverse direction (e.g., from 90 degrees to 0/360 degrees and from 0/360 degrees to 255 degrees=195 degrees).

The unique identifier (e.g., shared secret, seed value, random number), may be used to determine a rate of change of the polarization factor. For example, during Phase 1, a rate of change of 60 degrees per second (dps) may be set such that the set of pixels 302B start emitting polarized light 310A at the polarization factor and then immediately start changing the angle of polarization at a rate of 60 dps. Similarly, the viewing aid 102 may adjust the filters 112 to initially pass light at the polarization factor and then may continually adjust the filter to pass light that has its polarization angle changing at a rate of 60 dps. For example, motors 226A-B may start rotating the filters 112A-B at a rate of 60 dps after the viewing aid 102 and display 104 are synchronized at polarization factor_A. In an example, the rate of change may be based on the refresh rate of display 104. Each determined rate of change may be used for a predetermined time period such that the viewing aid 102 and display 104 may operate during an entire viewing session from one unique identifier, secret, or seed value. For example, each rate of change may be used for 20 seconds such that the display 104 and viewing aid 102 adjust according to various calculated rates of change based on a seed value where a rate of change of 60 dps is used for the first 20 seconds, 150 dps is used for the next 20 seconds, 240 dps is used for the third time interval, and so on.

Additionally, the polarization factor may also change based on the frame rate of the display 104. For example, the polarization factor may change several times per frame (e.g., twice per frame or 15). In another example, the predetermine period of time may indicate the number of frames per change, which may be adjusted by a user based on the type of display 104 and/or the level of security desired. For example, film may be displayed at 24 frames per second (fps) or 48 fps, a television monitor may display content at 30 fps or 60 fps, etc. Similarly, the polarization factor may change based on the refresh rate of the display 104. For example, a display 104 with a refresh rate of 120 Hz reconstructs the image on the display 104 at a rate of 120 times every second. The polarization factor may change after 15 refresh cycles (e.g., every 125 milliseconds on a 120 Hz display and 250 milliseconds on a 60 Hz display).

Figure 4:
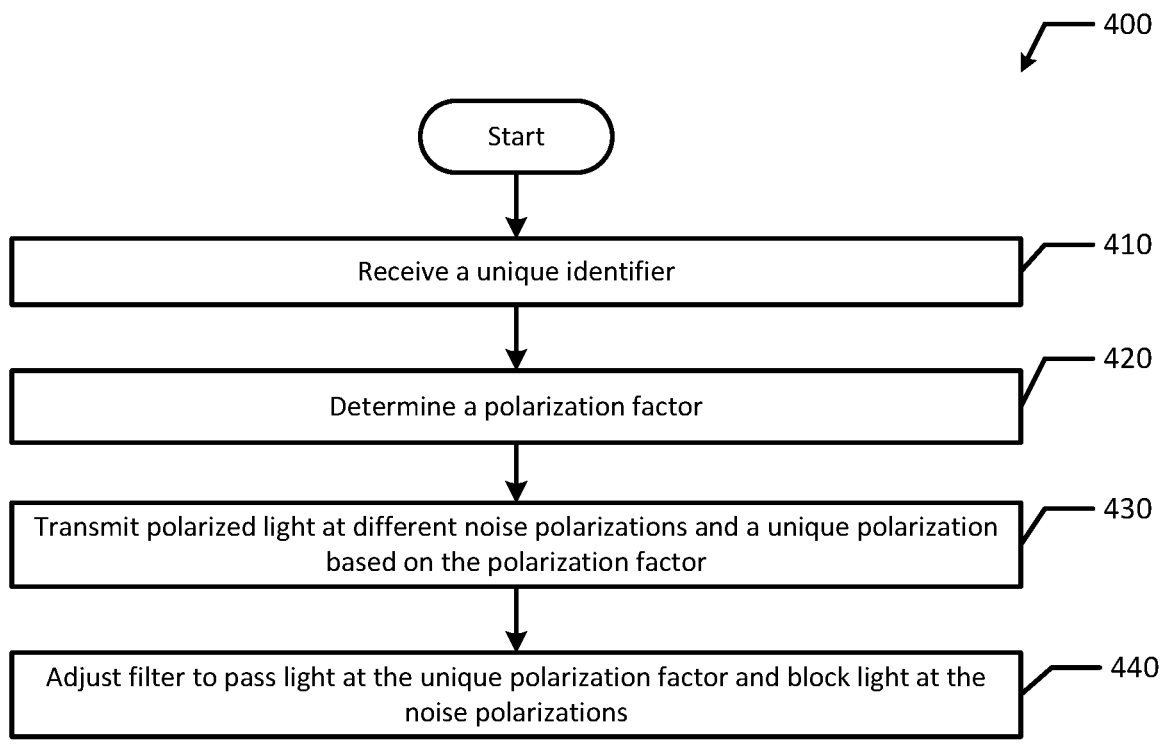
FIG. 4 illustrates a flowchart of an example process for adjusting a viewing aid and display to securely provide content to an authorized user, according to an example embodiment of the present disclosure.

FIG. 4 illustrates a flowchart of an example method 400 for adjusting a viewing aid and display to securely provide content to an authorized user, according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes receiving a unique identifier (block 410). For example, a viewing aid 102 and/or display 104 may receive a unique identifier from a unique identifier generator 108. In an example, the unique identifier may be a random number, a pseudo-random number, a key-secret pair, a token, a text string, a hash, a checksum, etc. Then, a polarization factor is determined (block 420). For example, the viewing aid 102 and/or display 104 may determine a polarization factor from the unique identifier. In an example, the unique identifier may be a seed value that is used to determine several polarization factors within a single viewing session.

Next, polarized light is transmitted at different noise polarizations and a unique polarization based on the polarization factor (block 430). For example, the display may transmit polarized light from the display at a plurality of polarizations including different noise polarizations and a unique polarization. The noise polarizations may be emitted from a predetermined set of pixels on display 104. In an example, the noise pixels may be capable of emitting light at a set number of different polarizations. For example, the noise pixels may emit light at 15 different polarization angles and at any given time, the polarization of a single pixel may be a random polarization angle within the set 15 different polarization angles. In another example, the noise pixels may include 15 groups of static pixels that emit light in different ways. For example, the noise polarizations may be a set of predetermined polarization angles such that they transmit what appears to be noise at random orientations, even though they may only transmit light at a set of polarization angles (e.g., 24 degrees, 48 degrees, 72 degrees, and so on). Noise pixels may also be turned off if their set polarization angle is the same or similar to the polarization factor. For example, if the polarization factor is 45 degrees and the noise pixel is set to emit polarized light at 44 degrees, the noise pixel may be turned off so the actual content is not washed out with noise at a similar angle. In another example, the location of the noise pixels may dynamically change during a viewing session.

Then, a filter is adjusted to pass light at the unique polarization factor and block light at the noise polarizations (block 440). For example, a viewing aid 102 may adjust a filter 112 associated with the viewing aid 102 to pass light at the unique polarization and block light at the plurality of different noise polarizations. The filter 112 may be a rotatable filter (e.g., rotatable filter 112A-B), a liquid crystal filter (e.g., LCD filter 122C-D), or other suitable filter configured to pass light at the unique polarization and block light at other polarizations. By passing light at the unique polarization and blocking the noise polarizations, the authorized user is able to securely view the protected content on display 104 while others are prevented from viewing the material.

Blocks 410 to 440 may be repeated several times during a viewing session to improve security by using multiple different polarization factors. In another example, blocks 420 to 440 may be repeated after receiving an initial secret or seed value that is used to calculate each successive polarization factor during the viewing session. A viewing session may use a single unique identifier or multiple unique identifiers. Additionally, the display 104 and viewing aid 102 may be synchronized at various times throughout a viewing session to ensure both devices are in synch.

Figure 5:
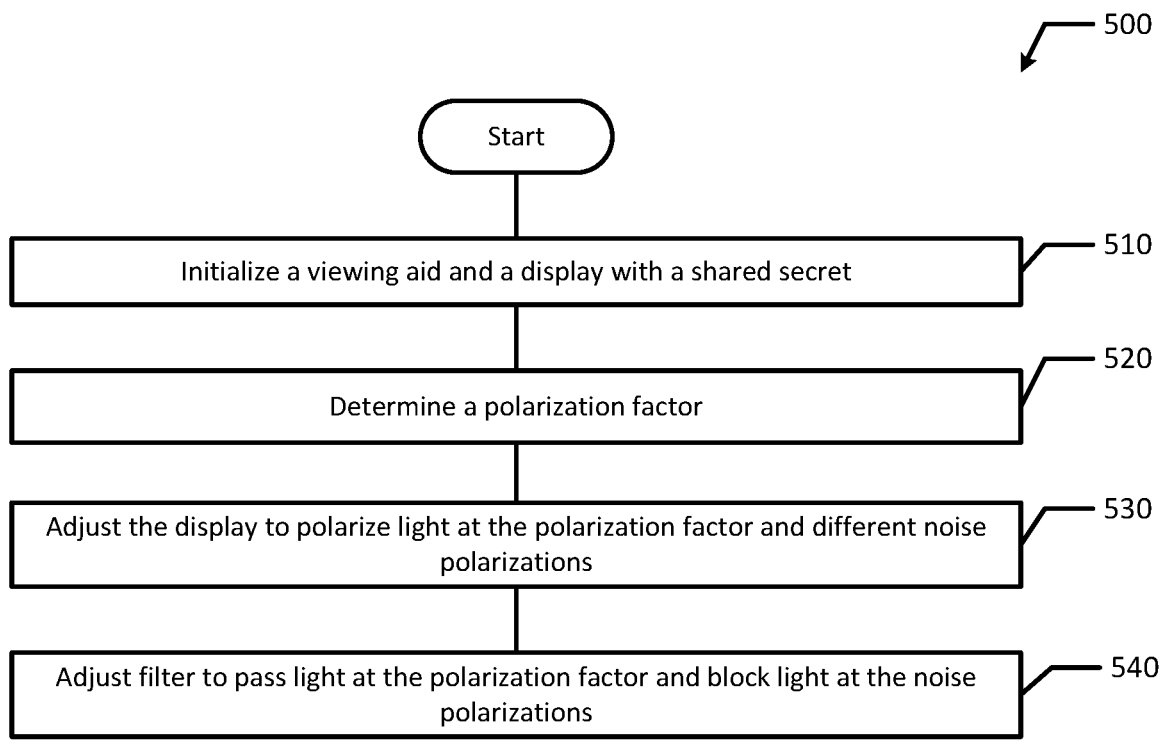
FIG. 5 illustrates a flowchart of an example process for adjusting a viewing aid and display to securely provide content to an authorized user, according to an example embodiment of the present disclosure.

FIG. 5 illustrates a flowchart of an example method 500 for adjusting a viewing aid and display to securely provide content to an authorized user, according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes initializing a viewing and a display with a shared secret (block 510). For example, a viewing aid 102 and a display 104 may be initialized with an encrypted shared secret, for example, from a subscription service. After initialization, the viewing aid 102 and the display 102 may decrypt the shared secret and may exchange a token or key-secret pair to ensure both devices are synchronized and/or paired. Then, a polarization factor is determined (block 520). For example, the viewing aid 102 and/or display 104 may determine a polarization factor from the shared secret. The shared secret or unique identifier may be converted to a polarization factor with a hashing function or other pseudo-random number generator. In an example, the polarization factor is an angle between 1 and 360 degrees.

Next, the display is adjusted to polarize light emitted from the display at the polarization factor and different noise polarizations (block 530). For example, the display may polarize a first portion of light emitted from the display at the polarization factor and a second portion of light emitted from the display at a plurality of different noise polarizations. The noise polarizations may be emitted from a predetermined set of pixels on display 104.

Then, a filter is adjusted to pass light at the polarization factor and block light at the noise polarizations (block 540). For example, a viewing aid 102 may adjust a filter 112 on the viewing aid 102 to pass the first portion of light emitted from the display 104 at the polarization and block light at the plurality of different noise polarizations. The filter 112 may be a rotatable filter (e.g., rotatable filter 112A-B), a liquid crystal filter (e.g., LCD filter 122C-D), or other suitable filter configured to pass light at the polarization factor and block light at other polarizations. By passing light at the polarization factor and blocking the noise polarizations, the authorized user is able to securely view the protected content on display 104 while others are prevented from viewing the material. In an example, blocks 520 to 540 may be repeated several times during a viewing session, for example, each time the viewing aid 102 and display 104 are synchronized.

Figure 6A:
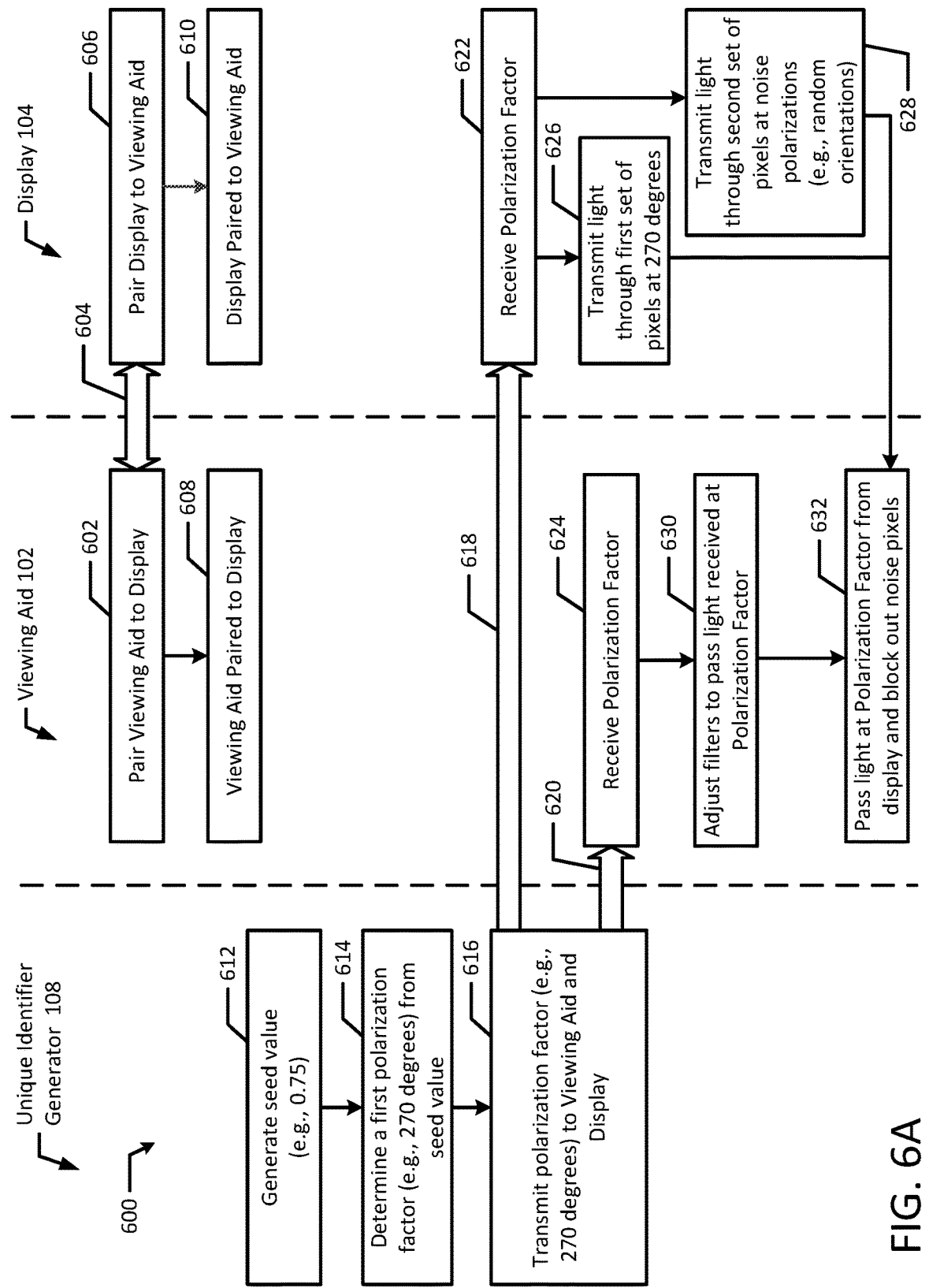
FIGS. 6A and 6B illustrate a flow diagram of an example process for adjusting a viewing aid and display to securely provide content to an authorized user, according to an example embodiment of the present disclosure.
Figure 6B:
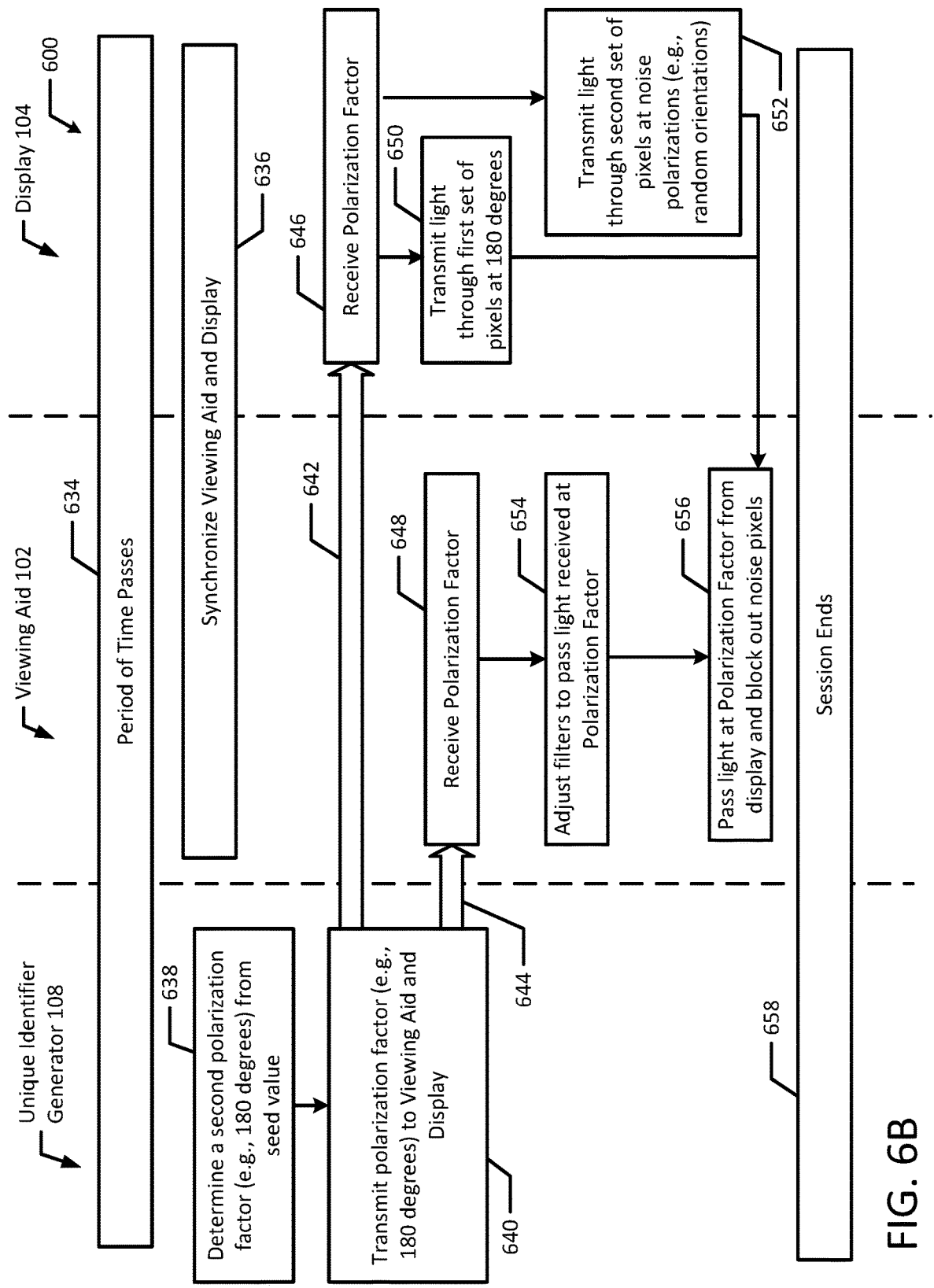

FIGS. 6A and 6B illustrate a flowchart of an example method 600 for adjusting a viewing aid and display to securely provide content to an authorized user in accordance with an example embodiment of the present disclosure. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, and some of the blocks described are optional. For example, a unique identifier generator 108 may communicate with a viewing aid 102 and display 104 to perform example method 600.

In the illustrated example, pairing takes place between the viewing aid 102 and display 104 (blocks 602 to 606). For example, the viewing aid 102 is paired to the display 104 while the display 104 is paired to the viewing aid 102. The pairing may involve sharing a secret or entering login information through a subscription service. Additionally, the viewing aid 102 and display 104 may be physically connected together and paired. In an example, an authentication process between the viewing aid 102 and display 104 ensures that the correct devices are paired together. For example, multiple viewing aids 102 and displays 104 may be used in close proximity to each other and an authentication process may prevent a different user from pairing to an authorized user's display 104. Then, the viewing aid 102 is paired to the display 104 (block 608) and the display 104 is paired to the viewing aid 102 (block 610).

A unique identifier generator 108 generates a seed value (block 612). For example, the unique identifier generator 108 may generate a seed value of 0.75. The seed value may be any random number, text string, etc. Then, the unique identifier generator 108 determines a first polarization factor from the seed value (block 614). For example, a polarization factor of 270 degrees may be determined by using a hashing function or other pseudo-random number generator. In the illustrated example, a basic function may be defined as the product of the seed value and 360 degrees for the first factor. In the illustrated example, the unique identifier generator 108 may be integrated into the display 104 or the viewing aid 102 and may use a shared processor to determine the polarization factor.

The polarization factor is transmitted to the viewing aid 102 and display 104 (blocks 616 to 620). In another example, the seed value is transmitted or shared with the viewing aid 102 and display 104, which then determine the polarization factors independently. Then, the display 104 receives the polarization factor (block 622) and the viewing aid receives the polarization factor (block 624). For example, the polarization factor may be transmitted from transmitter 110 and received by receivers 122A-B of the viewing aid 102 and display 104.

The display 104 transmits light through a first set of pixels at the polarization factor (e.g., 270 degrees) (block 626). For example, the display 104 may transmit polarized light at 270 degrees through a first set of pixels to display content (e.g., a word processing document, video, email) to an authorized user. While transmitting the content at the polarization factor, the display also transmits light through a second set of pixels at noise polarizations (block 628). The noise polarizations may be a set of predetermined polarization angles such that they transmit what appears to be noise at random orientations, even though they may only transmit light at a set of polarization angles (e.g., 45 degrees, 90 degrees, 135 degrees, 180 degrees, 225 degrees, 270 degrees, 315 degrees, 360 degrees). An unauthorized user without a viewing aid 102 may view the display as only showing white noise.

The viewing aid 102 adjusts filters 112 to pass light received at the polarization factor (block 630). For example, the viewing aid 102 may rotate or configure its filters 112 such that they allow light at the polarization factor (e.g., 270 degrees) to pass through to the authorized user. Then, the viewing aid 102 passes light at the polarization factor from the display 104 and blocks out noise pixels (block 632). By adjusting the filter to pass light at the polarization factor, the noise pixels that emit light at different polarizations are blocked and thus not seen by the authorized user.

Continuing on FIG. 6B, a period of time passes. For example, 5 seconds may have passed which is the predetermined time to display content before determining another polarization factor. By constantly changing the polarization angle that the content is displayed at, the security is improved by limiting the time window for a security threat. For example, if a hacker was attempting to view the content by adjusting the filter on a lens, the hacker has a 5-second window to determine the polarization angle. Even if the hacker is successful, the polarization angle will change after the 5-second time window and the hacker will have to again try to determine the correct polarization angle for the next 5-second window. Thus, this example may suitably protect certain content (e.g., video), but a higher rate of changing the polarization factor may be required for other types of secure content (e.g., slide presentation with large static texts).

The viewing aid 102 and display 104 may be synchronized (block 636). For example, clocks 128A-B of the viewing aid 102 and display 104 may be used to synchronize both devices. The synchronization advantageously ensures that the viewing aid 102 and display 104 are using the same polarization factor at the same time.

Then, the unique identifier generator 108 determines a second polarization factor from the seed value (block 638). For example, a polarization factor of 180 degrees may be determined by using a hashing function or other pseudo-random number generator. In the illustrated example, a basic function may be defined as 90 degrees less than the previous polarization factor (e.g., 270 degrees−90 degrees=180 degrees) for each successive polarization factors. More intricate and complex functions may be used. Additionally, polarization factors may also be encrypted to further enhance security of the system.

The polarization factor is transmitted to the viewing aid 102 and display 104 (blocks 640 to 644). As discussed above, the seed value may be transmitted or shared with the viewing aid 102 and display 104, which then determine the polarization factors independently. Then, the display 104 receives the polarization factor (block 646) and the viewing aid receives the polarization factor (block 648). For example, the polarization factor may be transmitted from transmitter 110 and received by receivers 122A-B of the viewing aid 102 and display 104.

The display 104 transmits light through the first set of pixels at the polarization factor (e.g., 180 degrees) (block 650). For example, the display 104 may transmit polarized light at 180 degrees through the first set of pixels to display content (e.g., a word processing document, video, email) to the authorized user. While transmitting the content at the polarization factor, the display 104 also transmits light through the second set of pixels at noise polarizations (block 652). The noise polarizations may be random orientations such that they transmit what appears to be noise at random orientations. In an example, the noise polarizations may be different than the polarizations used in block 628.

The viewing aid 102 adjusts filters 112 to pass light received at the polarization factor (block 654). For example, the viewing aid 102 may rotate or configure its filters 112 such that they allow light at the polarization factor (e.g., 180 degrees) to pass through to the authorized user. Then, the viewing aid 102 passes light at the polarization factor from the display 104 and blocks out noise pixels (block 656). Again, by adjusting the filter to pass light at the polarization factor, the noise pixels that emit light at different polarizations are blocked and thus not seen by the authorized user.

Thus, unauthorized users are prevented from viewing the displayed content, even other individuals that have a direct line of sight to the display (e.g., an unauthorized user over the authorized user's shoulder). Then, the session ends (block 658). At the start of a new session, a new seed value may be generated and used to determine polarization factors for the next session.

Figure 7:
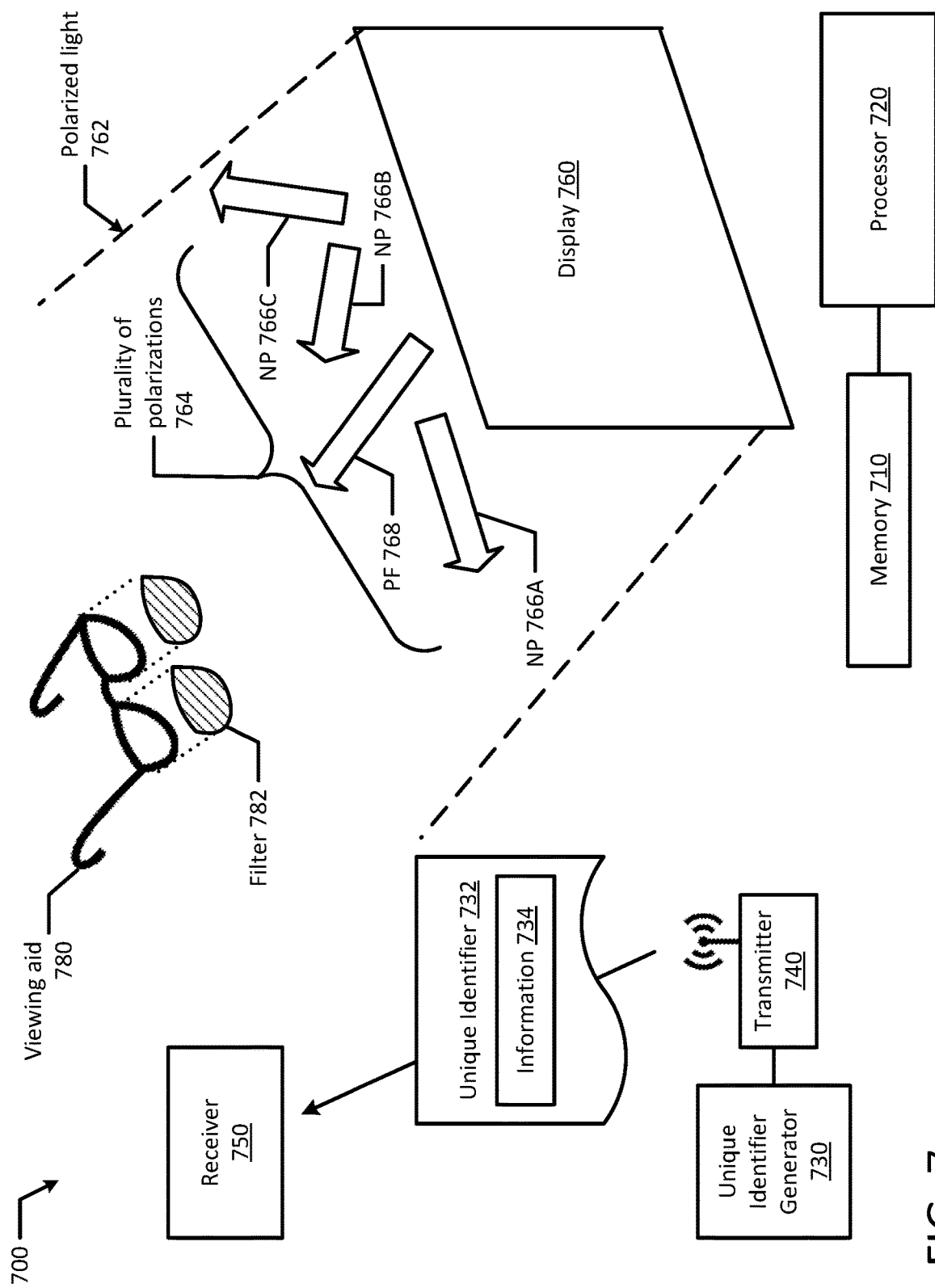
FIG. 7 illustrates a block diagram of an example dynamic privacy system for viewing a display, according to an example embodiment of the present disclosure.

FIG. 7 is a block diagram of an example dynamic privacy system 700 for viewing a display 104. The reverse order submission system 500 includes a memory 710, a processor 720 in communication with the memory 710, a unique identifier generator 730, a transmitter 740, a receiver 750, a display 760, and a viewing aid 780. The transmitter 740 is configured to transmit information 734 about a unique identifier 732 generated from the unique identifier generator 730. The receiver 750 is configured to receive the information 734 from the transmitter 740. The display 760 is configured to emit polarized light 762 at a plurality of polarizations 764. Additionally, the plurality of polarizations 764 includes a plurality of different noise polarizations (e.g., NP 766A-C) and polarized light at a polarization factor 768 based on the unique identifier 732. The viewing aid 780 has a filter 782 that is configured to pass light at the polarization factor 768 and block light at the plurality of different noise polarizations (e.g., NP 766A-C), which allows the authorized user to securely view the display while preventing and blocking unauthorized viewers from seeing the content.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, a processor in communication with the memory, a unique identifier generator, a transmitter, at least one receiver, a display, and a viewing aid. The transmitter is configured to transmit information about a unique identifier generated from the unique identifier generator. The receiver is configured to receive the information from the transmitter. The display is configured to emit polarized light at a plurality of polarizations. Additionally, the plurality of polarizations includes a plurality of different noise polarizations and polarized light at a polarization factor based on the unique identifier. The viewing aid has a filter that is configured to pass light at the polarization factor and block light at the plurality of different noise polarizations.

In accordance with a 2nd exemplary aspect of the present disclosure, which may be used in combination with any one or more of the preceding aspects (e.g., the 1st aspect), the display includes liquid crystals that are configured to polarize light at the polarization factor.

In accordance with a 3rd exemplary aspect of the present disclosure, which may be used in combination with any one or more of the preceding aspects (e.g., the 1st aspect), the filter is a rotatable filter.

In accordance with a 4th exemplary aspect of the present disclosure, which may be used in combination with any one or more of the preceding aspects (e.g., the 3rd aspect), the viewing aid includes a motor that is configured to rotate the rotatable filter.

In accordance with a 5th exemplary aspect of the present disclosure, which may be used in combination with any one or more of the preceding aspects (e.g., the 1st aspect), the filter is a liquid crystal filter.

In accordance with a 6th exemplary aspect of the present disclosure, which may be used in combination with any one or more of the preceding aspects (e.g., the 5th aspect), the viewing aid includes a power source that is configured to apply a voltage across the liquid crystal filter.

In accordance with a 7th exemplary aspect of the present disclosure, which may be used in combination with any one or more of the preceding aspects (e.g., the 1st aspect), the unique identifier is a random number, a pseudo-random number, a key-secret pair, or a token.

In accordance with an 8th exemplary aspect of the present disclosure, which may be used in combination with any one or more of the preceding aspects (e.g., the 1st aspect), the polarization factor is a number between 1 and 360 and is determined from the unique identifier.

In accordance with a 9th exemplary aspect of the present disclosure, which may be used in combination with any one or more of the preceding aspects (e.g., the 1st aspect), the unique identifier generator is configured to generate a first unique identifier at a first time, a second unique identifier at a second time, and a third unique identifier at a third time.

In accordance with a 10th exemplary aspect of the present disclosure, which may be used in combination with any one or more of the preceding aspects (e.g., the 1st aspect), the system includes a synchronizer configured to synchronize a timing of the viewing aid and the display.

In accordance with an 11th exemplary aspect of the present disclosure, which may be used in combination with any one or more of the preceding aspects (e.g., the 1st aspect), the system includes a level sensor on the viewing aid. The level sensor is configured to measure the viewing angle of the viewing aid and synchronize the viewing aid angle to a viewing angle of the display.

In accordance with a 12th exemplary aspect of the present disclosure, which may be used in combination with any one or more of the preceding aspects (e.g., the 1st aspect), the system includes a level sensor on the display. The level sensor is configured to measure the viewing angle of the display and synchronize the display angle to a viewing angle of the viewing aid.

In accordance with a 13th exemplary aspect of the present disclosure, which may be used in combination with any one or more of the preceding aspects (e.g., the 1st aspect), the unique identifier is a seed value, and a successive polarization factor is based on the seed value.

Aspects of the subject matter described herein may be useful alone or in combination with one or more other aspects described herein. In a 14th exemplary aspect of the present disclosure, a system includes a first memory associated with a display, a second memory associated with a viewing aid, a unique identifier generator, and at least one processor in communication with the first memory and the second memory. The at least one processor is configured to (i) receive a unique identifier from the unique identifier generator, (ii) determine a polarization factor from the unique identifier, (iii) transmit a polarized light from the display at a plurality of polarizations including a plurality of different noise polarizations and a unique polarization based on the polarization factor, (iv) adjust a filter associated with the viewing aid to pass the polarized light at the unique polarization and block light at the plurality of different noise polarizations, and (v) iterate (i), (ii), (iii), and (iv) for each successive unique identifier generated by the unique identifier generator.

In accordance with a 15th exemplary aspect of the present disclosure, which may be used in combination with any one or more of the preceding aspects (e.g., the 14th aspect), the display includes a plurality of pixels where a first set of the plurality of pixels emit light at the plurality of different noise polarizations, and a second set of the plurality of pixels emit light at the unique polarization.

In accordance with a 16th exemplary aspect of the present disclosure, which may be used in combination with any one or more of the preceding aspects (e.g., the 14th aspect), the viewing aid includes a motor and a rotatable filter, wherein the motor is configured to rotate the rotatable filter.

In accordance with a 17th exemplary aspect of the present disclosure, which may be used in combination with any one or more of the preceding aspects (e.g., the 14th aspect), the viewing aid includes a liquid crystal filter that adjusts based on an applied voltage across the liquid crystal filter.

In accordance with an 18th exemplary aspect of the present disclosure, which may be used in combination with any one or more of the preceding aspects (e.g., the 14th aspect), the unique identifier is a random number, a pseudo-random number, a key-secret pair, or a token.

In accordance with a 19th exemplary aspect of the present disclosure, which may be used in combination with any one or more of the preceding aspects (e.g., the 14th aspect), polarization factor is a number between 1 and 360 and is determined from the unique identifier.

In accordance with a 20th exemplary aspect of the present disclosure, which may be used in combination with any one or more of the preceding aspects (e.g., the 14th aspect), the unique polarization is circular polarization.

In accordance with a 21st exemplary aspect of the present disclosure, which may be used in combination with any one or more of the preceding aspects (e.g., the 14th aspect), the viewing aid is a headset, a pair of glasses, a visor, a helmet, a face shield, a pair of goggles, or a hand-held viewing scope.

Aspects of the subject matter described herein may be useful alone or in combination with one or more other aspects described herein. In a 22nd exemplary aspect of the present disclosure, a method includes generating a first unique identifier, sharing the first unique identifier with a viewing aid and a display, determining a first polarization factor from the first unique identifier, adjusting the display to polarize a first portion of light emitted from the display at the first polarization factor, and adjusting a filter on the viewing aid to pass the first portion light emitted from the display at the first polarization factor.

In accordance with a 23rd exemplary aspect of the present disclosure, which may be used in combination with any one or more of the preceding aspects (e.g., the 22nd aspect), the method includes generating a second unique identifier after a period of time, sharing the second unique identifier with the viewing aid and the display, determining a second polarization factor from the second unique identifier, adjusting the display to polarize a second portion of light emitted from the display at the second polarization factor, and adjusting the filter on the viewing aid to pass the second portion of light emitted from the display at the second polarization factor.

In accordance with a 24th exemplary aspect of the present disclosure, which may be used in combination with any one or more of the preceding aspects (e.g., the 23rd aspect), the method further includes re-synchronizing a timing of the viewing aid and the display after the period of time.

In accordance with a 25th exemplary aspect of the present disclosure, which may be used in combination with any one or more of the preceding aspects (e.g., the 23rd aspect), adjusting the filter includes applying a second voltage across a liquid crystal filter to accept the second portion of light emitted from the display at the second polarization factor.

In accordance with a 26th exemplary aspect of the present disclosure, which may be used in combination with any one or more of the preceding aspects (e.g., the 22nd aspect), the first portion of light is associated with a first set of pixels on the display and the second portion of light is associated with a second set of pixels on the display.

In accordance with a 27th exemplary aspect of the present disclosure, which may be used in combination with any one or more of the preceding aspects (e.g., the 26th aspect), the first set of pixels and the second set of pixels are the same.

In accordance with a 28th exemplary aspect of the present disclosure, which may be used in combination with any one or more of the preceding aspects (e.g., the 22nd aspect), the polarization factor is between 1 and 360 degrees.

In accordance with a 29th exemplary aspect of the present disclosure, which may be used in combination with any one or more of the preceding aspects (e.g., the 22nd aspect), the method further includes synchronizing a timing of the viewing aid and the display.

In accordance with a 30th exemplary aspect of the present disclosure, which may be used in combination with any one or more of the preceding aspects (e.g., the 22nd aspect), adjusting the filter includes rotating a mechanical filter on the viewing aid.

In accordance with a 31st exemplary aspect of the present disclosure, which may be used in combination with any one or more of the preceding aspects (e.g., the 22nd aspect), adjusting the filter includes applying a first voltage across a liquid crystal filter to pass the first portion of light emitted from the display at the first polarization factor.

In accordance with a 32nd exemplary aspect of the present disclosure, which may be used in combination with any one or more of the preceding aspects (e.g., the 22nd aspect), the first polarization factor indicates a rate of change.

In accordance with a 33rd exemplary aspect of the present disclosure, which may be used in combination with any one or more of the preceding aspects (e.g., the 22nd aspect), the method further includes measuring a viewing angle of the viewing aid.

In accordance with a 34th exemplary aspect of the present disclosure, which may be used in combination with any one or more of the preceding aspects (e.g., the 33rd aspect), the filter on the viewing aid is adjusted based on the viewing angle and the polarization factor.

Aspects of the subject matter described herein may be useful alone or in combination with one or more other aspects described herein. In a 35th exemplary aspect of the present disclosure, a method includes (i) receiving a unique identifier from the unique identifier generator, (ii) determining a polarization factor from the unique identifier, (iii) transmitting a polarized light from the display at a plurality of polarizations including a plurality of different noise polarizations and a unique polarization based on the polarization factor, (iv) adjusting a filter associated with a viewing aid to pass light at the unique polarization and block light at the plurality of different noise polarizations, and (v) iterating (i), (ii), (iii), and (iv) for each successive unique identifier received.

Aspects of the subject matter described herein may be useful alone or in combination with one or more other aspects described herein. In a 36th exemplary aspect of the present disclosure, a system includes a means for generating a unique identifier, a means for sharing the unique identifier with a viewing aid and a display, a means for determining a polarization factor from the unique identifier, a means for adjusting the display to polarize a portion of light emitted from the display at the polarization factor, and a means for adjusting a filter on the viewing aid to pass the portion light emitted from the display at the polarization factor.

Aspects of the subject matter described herein may be useful alone or in combination with one or more other aspects described herein. In a 37th exemplary aspect of the present disclosure, a non-transitory machine-readable medium storing code, which when executed by a processor, is configured to (i) receive a unique identifier from the unique identifier generator, (ii) determine a polarization factor from the unique identifier, (iii) transmit a polarized light from the display at a plurality of polarizations including a plurality of different noise polarizations and a unique polarization based on the polarization factor, (iv) adjust a filter associated with the viewing to pass light at the unique polarization and block light at the plurality of different noise polarizations, and (v) iterate (i), (ii), (iii), and (iv) for each successive unique identifier received.

Aspects of the subject matter described herein may be useful alone or in combination with one or more other aspects described herein. In a 38th exemplary aspect of the present disclosure, a method includes initializing a viewing aid and a display with a shared secret, determining a first polarization factor from the shared secret, adjusting the display to polarize a first portion of light emitted from the display at the first polarization factor and a second portion of light emitted from the display at a plurality of noise polarizations, and adjusting a filter on the viewing aid to pass the first portion light emitted from the display at the first polarization factor and block light at the plurality of different noise polarizations.

In accordance with a 39th exemplary aspect of the present disclosure, which may be used in combination with any one or more of the preceding aspects (e.g., the 38th aspect), the method further includes determining a second polarization factor from the shared secret.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory;
a unique identifier generator;
a transmitter configured to transmit information about a unique identifier generated from the unique identifier generator;
at least one receiver configured to receive the information from the transmitter;
a display configured to emit polarized light at a plurality of polarizations, wherein the plurality of polarizations includes a plurality of different noise polarizations and polarized light at a polarization factor based on the unique identifier; and
a viewing aid having a filter, wherein the filter is configured to pass light at the polarization factor and block light at the plurality of different noise polarizations.

2. The system of claim 1, wherein the display includes liquid crystals configured to polarize light at the polarization factor.

3. The system of claim 1, wherein the filter is a rotatable filter.

4. The system of claim 3, wherein the viewing aid includes a motor, wherein the motor is configured to rotate the rotatable filter.

5. The system of claim 1, wherein the filter is a liquid crystal filter.

6. The system of claim 5, wherein the viewing aid includes a power source, wherein the power source is configured to apply a voltage across the liquid crystal filter.

7. The system of claim 1, wherein the unique identifier is one of a random number, a pseudo-random number, a key-secret pair, or a token.

8. The system of claim 1, further comprising a synchronizer configured to synchronize a timing of the viewing aid and the display.

9. The system of claim 1, further comprising a level sensor on the viewing aid, wherein the level sensor is configured to measure the viewing angle of the viewing aid and synchronize the viewing aid angle to a viewing angle of the display.

10. The system of claim 1, further comprising a level sensor on the display, wherein the level sensor is configured to measure the viewing angle of the display and synchronize the display angle to a viewing angle of the viewing aid.

11. The system of claim 1, wherein the unique identifier is a seed value, and a successive polarization factor is based on the seed value.

12. The system of claim 1, wherein the viewing aid is one of a headset, a pair of glasses, a visor, a helmet, a face shield, a pair of goggles, and a hand-held viewing scope.

13. The system of claim 1, wherein the polarization factor is a number between 1 and 360 and is determined from the unique identifier.

* * * * *